(No Model.) 2 Sheets—Sheet 1.
J. H. BLESSING.
WATER FILTERING APPARATUS.
No. 442,602. Patented Dec. 16, 1890.
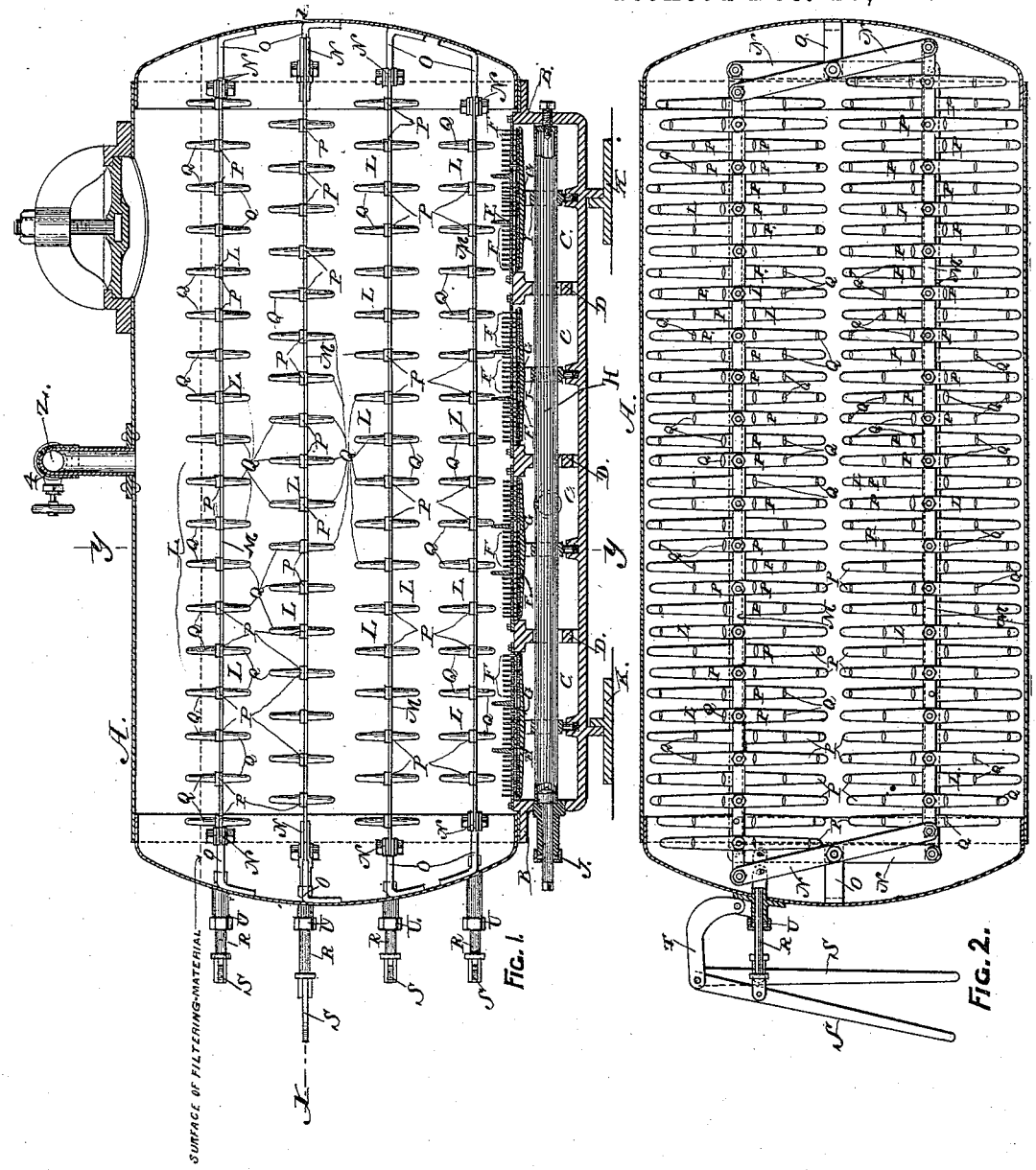
Witnesses:
S. B. Brewer
E. Savage
Inventor:
James H. Blessing,
by William W. Low.
Attorney.

(No Model.) 2 Sheets—Sheet 2.

J. H. BLESSING.
WATER FILTERING APPARATUS.

No. 442,602. Patented Dec. 16, 1890.

Witnesses:
S. B. Brewer
E. Savage

Inventor:
JAMES H. BLESSING,
by William H. Low
Attorney.

UNITED STATES PATENT OFFICE.

JAMES H. BLESSING, OF ALBANY, NEW YORK.

WATER-FILTERING APPARATUS.

SPECIFICATION forming part of Letters Patent No. 442,602, dated December 16, 1890.

Application filed August 2, 1890. Serial No. 360,734. (No model.)

*To all whom it may concern:*

Be it known that I, JAMES H. BLESSING, of the city and county of Albany, in the State of New York, have invented new and useful Improvements in Water-Filtering Apparatus, of which the following is a specification.

My invention relates to the class of filtering apparatus in which the operation of cleansing the filtering material is effected by changing the direction of the flow of the water-currents through said material, and in which provision is made for loosening up and disturbing the particles of the filtering material for the purpose of facilitating the cleansing of the same; and the object of this invention is to provide means for disturbing different horizontal layers of said filtering material without disturbance to the balance of said material. I attain this object by the means illustrated in the accompanying drawings, which are herein referred to and form part of this specification, and in which—

Figure 3:
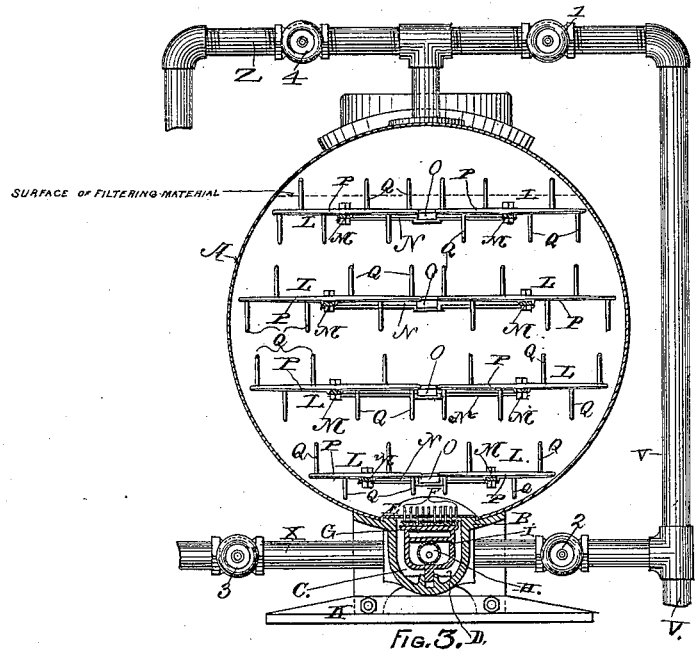
Figure 4:
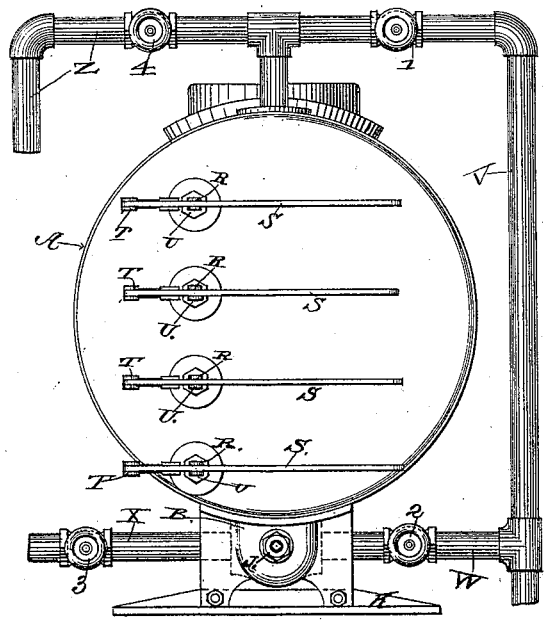

Figure 1 is a longitudinal section of a filtering apparatus containing my improvements. Fig. 2 is a horizontal section at the line X X on Fig. 1. Fig. 3 is a transverse section at the line Y Y on Fig. 1, and Fig. 4 is an end elevation of my filtering apparatus.

As represented in the drawings, A designates the shell or casing of my filtering apparatus, which is preferably made cylindrical with both ends closed. Said casing is carried upon a saddle B, which contains a series of filtered-water chambers C, partially separated from each other by transverse partitions D, provided with suitable openings by which the water is allowed free circulation from one of said chambers to another. Each of said filtered-water chambers is separated from the interior of the casing A by means of a percolating-plate E, provided with a series of perforations, and each of said perforations contains a movable pin F, of a slightly smaller diameter than the hole which contains it, the difference in said diameters being sufficient to permit the water to ooze through the slight openings formed thereby; but such openings are insufficient to allow the particles of the filtering material to escape therethrough. Said pins are attached to heads G, to which a vertical reciprocating motion is imparted simultaneously by means of a shaft H, whose journals are eccentric to the body of said shaft. The latter passes through a loop I, pendent from each of the heads G, so that by imparting a rotatory motion to the shafts H the required reciprocations will be given to said heads, and thereby the perforations in the plate E and the pins F moving therein are prevented from becoming fouled sufficiently to prevent water from oozing through a slight space left between their diameters. Said percolating-plates and movable pins form no part of this invention, the same being fully shown and described in Letters Patent Nos. 352,943 and 352,944, which were granted to me November 23, 1886. One end of the shaft H projects from the saddle B and passes through a stuffing-box J, and the outer end of said shaft is fitted to receive a handle or other appliance by which said shaft can be rotated. The saddle B is provided with feet K, which afford a firm support for the apparatus.

L designates the horizontally-reciprocating agitators, which are arranged at different planes, so that each set of said agitators on different levels can be manipulated independently of the others. Each set of the agitators is composed of a pair of parallel bars M, connected to opposite ends of vibratile levers N, pivoted to brackets O, fixed to the opposite heads of the casing A. Each of the bars M is provided with a series of transverse arms P, having prongs Q projecting upward and downward therefrom. Said arms and prongs afford the means for disturbing the particles of the filtering material of the layer to which any one of said agitators is specially appropriated. Each vibratile lever N at one end of the apparatus is connected by a link R to a corresponding lever S, fulcrumed to a link T, pivoted to the corresponding head of the casing A. The link R is fitted to slide in a stuffing-box U, fixed to the head of the casing, and the inner end of said link is connected near one end of the corresponding vibratile lever N, so that a vibratory motion imparted to the operating-lever S will be transmitted to the vibratile levers N, whereby the bars M and arms P, belonging to the same set of agitators, will receive a reciprocating motion to disturb and agitate the filtering material of the layer in which it is located.

V designates a water-supply pipe by which the water from the source of supply is conveyed into the apparatus, so that the water during the process of filtration will be delivered into the upper portion of the casing A. Said pipe is provided with a stop-valve 1, by which the flow of water directly into the top of the apparatus can be prevented. Said pipe is also provided with a branch pipe W, leading into the filtered-water chambers of the saddle B, whereby the inflow of water into the apparatus can be delivered into the lower side of the same, as in the process of washing the filtering material, and said branch pipe is provided with a stop-valve 2, whereby the flow of water through said pipe can be prevented.

X designates the discharge-pipe whereby the filtered water is conveyed from the apparatus to any required point of delivery. Said discharge-pipe is provided with a stop-valve 3 for preventing the flow of water through said pipe.

Z designates a waste-water pipe through which the waste water contaminated with dirt and other matter eliminated from the filtering material by the process of cleansing the latter is conveyed from the apparatus into a drain or other suitable means for carrying off said waste water. The pipe Z is provided with a stop-valve 4 for closing the passage through said pipe.

The operation of filtration is effected by passing the water downward through the filtering material, and thereby the impurities held in suspension by the water will be deposited in the filtering material, the greatest deposition being at or near the surface of said material and becoming less toward the lower portion of the same, and during the process of filtration the stop-valves 1 and 3 should be opened and the stop-valves 2 and 4 closed, so that the flow of water will be forced to enter the apparatus at the top, thence passing downwardly through the filtering material and percolating-plates into the filtered-water chambers C, thence through the discharge-pipe X to the place of delivery desired.

The operation of cleansing the filtering material is effected in the following manner: The stop-valves 1 and 3 are closed and the stop-valves 2 and 4 are opened. While said stop-valves are in the condition last named the water will enter the lower part of the apparatus through the branch pipe W and flow upwardly through the filtering material, thereby loosening up and separating the particles of the latter into a condition that will readily permit the agitators L to be freely reciprocated, and it should be understood that this condition of the filtering material will obtain whenever the current of water is turned to flow upwardly, whether the entire body or only a portion of the filtering material is to be cleansed, and then if only the upper stratum of the filtering material is to be cleansed the uppermost set of the agitators L is reciprocated by means of its operating-lever S, and thereby the particles of the filtering material are disturbed and agitated in such manner that any foreign matter deposited thereon will be separated therefrom, so as to be carried off by the current of water flowing upwardly through the filtering material, and the befouled water will flow out of the apparatus through the waste-water pipe Z. When the entire body of the filtering material is to be cleansed, the several stop-valves are set in the conditions last described, and the several sets of agitators L will be reciprocated successively until the waste water presents a clear appearance, and when this point has been accomplished the several stop-valves should be restored to a condition to allow the water to flow downwardly through the filtering material, and thereupon the apparatus will be in condition for the resumption of filtration.

This filtering apparatus is adapted to filtering the water from muddy streams, and the process of filtration being effected by passing the water downwardly through the filtering material the impurities which are eliminated from the water will be deposited in the filtering material, and will be removed therefrom very effectually in the manner above described.

What I claim as my invention, and desire to secure by Letters Patent, is—

1. In a filtering apparatus, a series of agitators arranged in sets at different levels and each set being fitted to receive a reciprocating motion in a horizontal direction independently of the others, whereby the particles of the filtering material at the different levels of the mass may be segregated without disturbing the other portions of said material, as and for the purpose herein specified.

2. In a filtering apparatus, a series of horizontally-reciprocating agitators arranged in sets at different levels, each set consisting of a pair of parallel bars connected to opposite ends of vibratile arms and each bar being provided with a series of transverse arms having prongs thereon, and an operating-lever fixed exteriorly to the casing of said filter and connected to one of said vibratile arms, as and for the purpose herein specified.

JAMES H. BLESSING.

Witnesses:
WM. F. WHEELOCK,
WM. H. LOW.